Oct. 25, 1932.     D. D. DOOLEY     1,884,616
FILTER
Filed May 5, 1930

Inventor
Delmar D. Dooley
By Marr Jackson Boettcher
J. Dienner Att'ys

Patented Oct. 25, 1932

1,884,616

UNITED STATES PATENT OFFICE

DELMAR D. DOOLEY, OF ROCK ISLAND, ILLINOIS, ASSIGNOR TO DOOLEY IMPROVEMENTS, INC., OF ROCK ISLAND, ILLINOIS, A CORPORATION OF ILLINOIS

FILTER

Application filed May 5, 1930. Serial No. 449,835.

This relates primarily to oil filters, more particularly to cartridge filters of the discardable type.

It is common practice to pass the oil supplied to the splash pans of an automobile engine, or the oil supplied to the nozzle of an oil burner, through a filter which functions to remove solid particles from the oil thereby preventing their entry into the mechanism of the automobile engine or oil burner to the detriment of that device.

The present invention provides a filter cartridge adapted for use in an automobile, an oil burner, or other similar installations, the cartridge being hermetically sealed and containing a filter unit of sufficient effective area to permit passage of the requisite amount of oil without creating an unduly large pressure difference across the inlet and outlet ports of the cartridge. The cartridge so constructed is intended to be discarded after it has been used for a predetermined length of time, that is, for example, in an automobile after the car has been driven ten thousand miles.

The cartridge constructed for this purpose must necessarily be cheap so that its installation and replacement will not impose an undue burden upon the car owner, and moreover it must be leak-proof and at the same time effective for the purpose of straining solid particles out of the oil.

In an automotive vehicle, the oil drawn from the bottom of the crank case by the pump and returned to the splash pan is frequently heated to a rather high temperature during the operation of the motor. I have found that in certain oil filters of the cartridge type devised heretofore, the temperature of the oil is sufficiently high to oxidize the fabric of the filter at the point at which the oil first engages that fabric upon its entry into the cartridge. This oxidization of the fabric soon causes it to break or split with the result that the filter is disabled and unfiltered oil is pumped through the filter without having the solid particles entrained in the oil removed from it prior to its delivery to the engine. In other words, a filter while still in the oil line, is totally disabled and incapable of performing the functions it is designed to perform.

In my present invention I have provided a new and improved filter cartridge in which the oil delivered from the pump of the system is spread in a thin layer over a metallic plate that is maintained in good thermal contact with the exterior walls of the casing, this arrangement withdrawing the heat from the oil prior to its coming into contact with the fabric of the filter, and radiating that heat through the exterior walls of the casing.

The result is that the oil is cooled sufficiently to bring its temperature below the oxidizing point of the fabric prior to its coming into contact with the fabric so that the life of the filter is thereby increased and the likelihood of damage to the filter member because of oxidization is entirely removed.

The filter employed in the preferred embodiment of my invention consists of a band of soft fabric such as canton flannel disposed with its nap on the outside. This material is fluted into slots in a supporting spider, the fluting holding the fabric in the slots without the use of laces, stitching or other binding means, with the result that the entire area of the fabric is available for filtering oil, and consequently a maximum filtering surface is obtained with minimum overall dimensions.

Further objects of my invention, not specifically mentioned here, will be apparent from the detailed description and claims taken in connection with the accompanying drawing in which a preferred embodiment of it is shown by way of example and in which:

Figure 1:
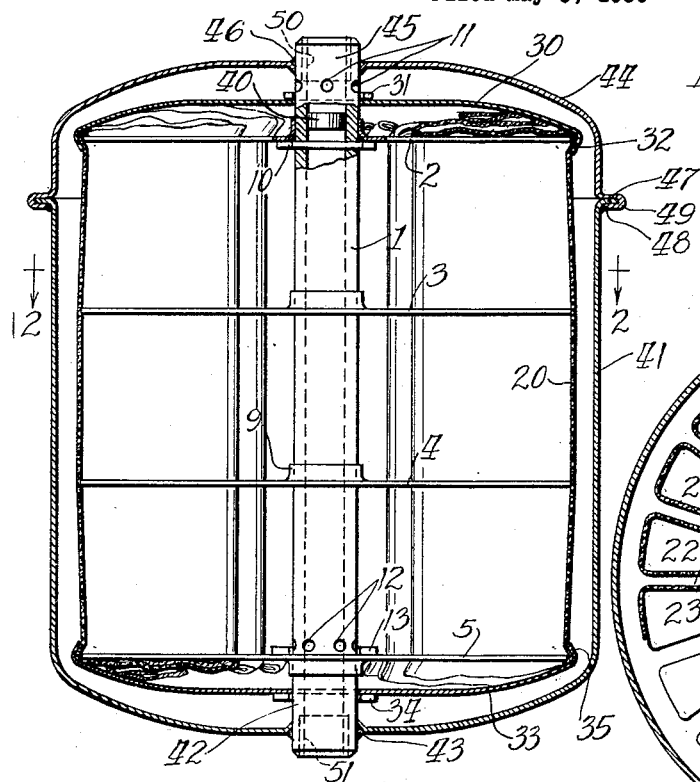
Figure 1 is a cross-sectional view of a completely assembled filter cartridge built in accordance with the teachings of my invention.

Referring to the drawing now in more detail, the cartridge comprises a length of pipe 1 upon which are pressed a plurality of spiders 2, 3, 4 and 5. These spiders are sheet metal stampings containing radially disposed slots 6 and 7 disposed alternately around the peripheral edge of the spider. At the center of the spider is a central opening 8 having a flanged edge 9, which is pressed onto the pipe 1 and which serves to hold the spider in place.

The pipe 1 is pierced adjacent the end spider 2 and a pin 10, preferably a cotter pin, is projected through the pipe to lock the spider 2 against movement longitudinally of the pipe. The pipe is also provided with a plurality of holes or ports 11 and a second plurality of ports 12 for a purpose which will be hereinafter brought out.

The end spider plate 5 is likewise secured against movement on the pipe 1 by a pin 13.

The framework so formed is covered with a fabric filter member 20, which preferably consists of a piece of cotton flannel or other suitable long nap material disposed with the nap outward. The fabric 20 is fluted into the slots 6 and 7 in the spiders, the spiders 2 to 5 inclusive being placed on the pipe so that the deep slots 6 align themselves in a line longitudinally of the pipe and the shallow slots 7 also align themselves. The fabric may be placed upon the framework in any preferred manner, such as by pushing it down into the deep slot 21 with a suitable tool which is held in place to hold the fabric in the bottom of this slot while the fabric is pushed into the adjacent shallow slot 22 by a similar tool. The tool employed to push the fabric into the slot 21 is then removed and employed to force the fabric into the slot 23 while the tool in the slot 22 is held in place. This operation is continued until the fabric has been fluted or tucked into all of the slots on the frame, the flutes so formed remaining in the slots without the aid of a lacing or other binding means.

The fabric 20 is longer than the distance between the end spiders 2 and 5, and projects beyond these spiders for a distance of approximately one inch. To seal the ends of the cylinder so formed, I have provided a dished disc 30 which is pressed on over the end section of the pipe 1 and rotated to fold and wad the projecting end of the fabric 20 over the outside surface of the end spider 2 and around the projecting end of the pipe 1. The dished disc 30 is held in place on the pipe in any preferred manner such as by a suitable pin 31, which is preferably a cotter pin, thereby securely binding the end of the fabric to the framework. A flanged edge 32 is rolled or otherwise formed in the disc 30 this edge extending over the peripheral edge of the spider 2 and the fabric that is drawn across this edge, and serves to securely lock the fabric from pulling loose from the disc and spider.

A similar dished disc 33 is pressed onto the projecting end of the pipe 1 to wad the opposite end of the fabric 20 against the outside surface of the spider 5, this disc being held on the pipe by a similar pin 34 and being provided with a rolled flange 35 which engages the spider 5 to lock the fabric on it.

The spider framework is thus covered by a fluted fabric forming a cylindrical member having the ends of the pipe 1 extending therefrom. Within the pipe, at a point adjacent the end spider 2, I have placed a baffle 40 which completely blocks the pipe at a point between the ports 11 and the cotter pin 10. The filter cartridge is then inserted in a cylindrical metallic casing 41 with the end 42 of the pipe 1 projecting through a central opening in that casing, that end being welded or soldered to the casing as shown at 43, to form an oil-tight joint. The cover 44 is placed on the open end of the casing 41, with the end 45 of the pipe projecting through this cover and soldered as at 46 to likewise form an oil-tight joint. The open end of the casing 41 is provided with a flange 47 and the lower end of the cover 44 is rolled over this flange 47 to form a standing seam 49 which may be soldered at 48 to form an oil-tight joint completely encasing the filter unit.

Preferably the pipe 1, the spiders 2 and 5 inclusive, and the casing 41 and cover 44 are all formed of sheet metal such as iron, iron being chosen because of its cheapness. However, if desired, brass, copper, or other metals may be substituted within the teachings of my invention.

The end 45 of the pipe 1 is preferably provided with internal threads 50 and the end 42 with internal thread 51, these threads preferably adapting the end of the pipe to receive a standard ⅛-inch automotive pipe fitting, although obviously other thread sizes or an external thread may be used if desired.

In the operation of the filter, oil is admitted through the end 45 by a suitable pipe connection, not shown, leading from the pump of the motor or burner. This oil is prevented from flowing lengthwise of the pipe 1 by the baffle 40, and flows out through the plurality of small ports 11 spreading itself over the outer surface of the dished disc 30. This disc being composed of a metal of good thermal conductivity and being secured to the pipe 1 which in turn is secured to the casing cover 44, a good thermal path is provided from the thin layer of oil on the disc 30 to the exterior surface of the cartridge from which the heat contained in the oil may be readily radiated. This cools the oil, reducing the temperature to such a point that it is not sufficiently high to oxidize the fabric and thereby damage it.

The oil flows from the upper surface of the disc 30 outwardly and down around the outside surface of the fabric 20, then through that fabric into the interior of the cylinder formed by it. Since the fabric 30 is provided with flutes, it presents a large cross-sectional area to the oil and the oil may therefore flow through it freely without building up an unduly high differential in pressure.

The oil which filters through the fabric 20 into the cylinder formed by that fabric flows through the holes 19 in the spiders 3 and 4, into the space between the spiders 4 and 5, where it can flow through the port 12 into the pipe 1 and thence out through the end 42 of that pipe which is connected by suitable pipe connections, not shown, to the place to which the oil is to be delivered.

Solid particles entrained in the oil are collected on the outer surface of the filter fabric 20 and imbedded in the nap of that fabric which holds them securely.

Figure 3:
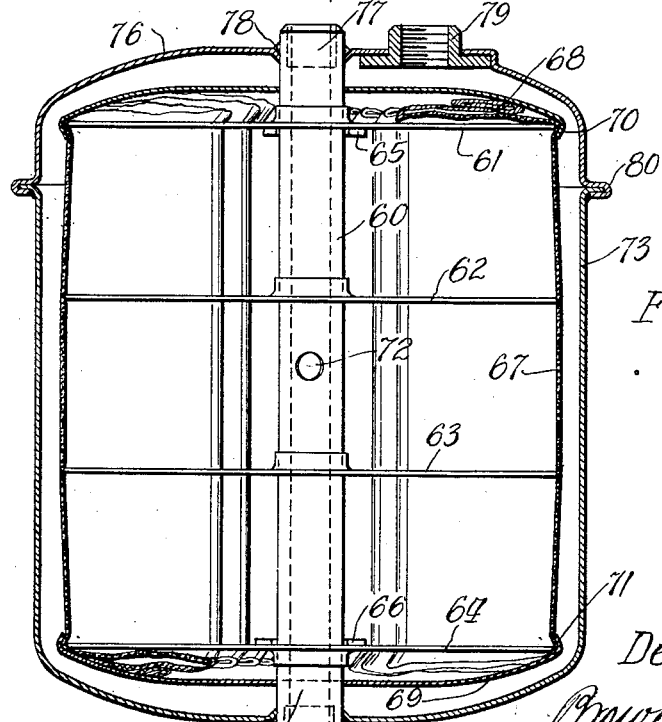
Figure 3 is a cross-sectional view of a slightly modified form of my invention.

In the embodiment of my invention shown in Figure 1, the oil that is to be filtered is admitted to the cartridge through the pipe end 45 located in one end of the cartridge and the oil is drained from the cartridge through the pipe 42 projecting from the opposite end. In certain instances because of the existing piping on an automobile, for example, it may be advantageous to arrange the filter so that the inlet and outlet ports of it are located on the same end of the cartridge. To this end I have provided a modified construction, shown in Figure 3. This form of the filter comprises a central pipe 60 having spiders 61, 62, 63 and 64 pressed thereon and the end spiders held by cotter pins 65 and 66 in the hereinbefore explained manner. The fabric filter 67 is placed on the frame-work so formed in the same manner as the fabric 20 of the previously explained embodiment, and discs 68 and 69 are pressed on the projecting ends of the pipe to wad the ends of the fabric 67 against the end plates 61 and 64 respectively. Flanges 70 and 71 are turned over the end spiders to lock the fabric in place.

The pipe 60 is not provided with a baffle, and is provided with a single series of relatively large ports 72 preferably located at its meridian point.

The casing 73 is identical with the casing 41, and the projecting end 74 of the pipe 60 soldered therein at 75 to form an oil-tight joint. The cover 76 contains an opening into which the projecting end 77 of the pipe 60 is soldered at 78 and also contains an opening into which the inlet bushing 79 is fastened by welding or soldering. The inlet bushing and the ends 74 and 77 of the pipe are threaded internally to accommodate pipe fittings such as the standard ⅛-inch automotive pipe fitting. The cover 76 is fastened to the casing 73 by a standing seam 80 which is soldered or welded to form a liquid tight joint.

In this embodiment of the invention, oil is admitted to the cartridge through the pipe, not shown, connected to the inlet port 79, that oil spreading over the surface of the disc 68 to be cooled prior to its coming into contact with the fabric 67. The oil filters its way through the fabric into the inner chamber formed by that fabric where it enters the pipe 60 through the ports 72. The discharge or outlet pipework from the cartridge may be attached to it either at the pipe end 77 or 74, and the end of the pipe not used to accommodate the outlet pipe is plugged with a suitable threaded plug to close that end of the pipe. The embodiment shown in Figure 3 therefore adapts the cartridge to particular conditions which cannot readily be met by the preferred embodiments shown in Figure 1.

Figure 2:
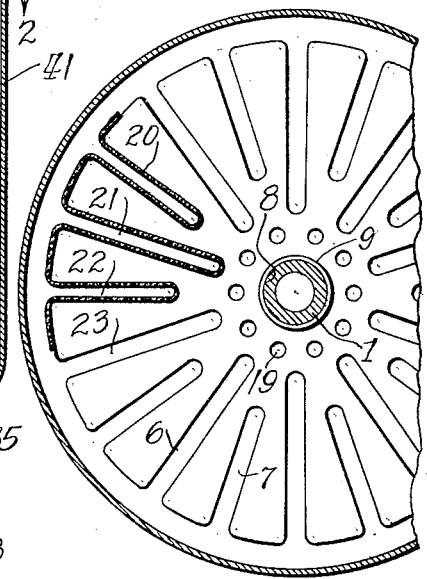
Figure 2 is a cross-sectional view of the cartridge shown in Figure 1 taken along the line 2—2 looking in the direction of the arrows.

As in the modification shown in Figures 1 and 2, the cartridge is designed to be discarded when the fabric 67 has become so coated with sediment that its filtering properties are impaired.

Filters built in accordance with the teachings of my invention can be fabricated at low cost and sold to the consuming public at a sufficiently low price that they may be discarded when their usefulness has expired without great monetary loss. The unit is completely sealed and free from leaks and can be installed on an automobile or in an oil burner installation and operated over a long period of time without any attention. The task of installing the unit and of replacing it when its usefulness has passed is simple and can be made without the use of special tools by an ordinary garage man at a reasonable cost.

While I have chosen to show a preferred embodiment of my invention, I have done so by way of example only and am not to be limited by the specific details shown.

What I consider new and desire to have protected by Letters Patent is pointed out in the appended claims.

What is claimed is:

1. In a filter, the combination of an outer shell comprising a cylindrical wall having heads at each end, a tubular rod extending between said heads and extending through at least one of them, radially slotted disks fixed at opposite ends of the rod, a sheet of filter fabric fluted into said radial slots and having the ends of the flutes folded over the outer sides of the plates to close off the ends of the flutes beyond the plates, and circular heads fastened to the central rod and lying axially beyond said plates and pressing against the folded ends of said flutes to keep the fabric in place.

2. A filter comprising in combination a substantially cylindrical casing, a hollow rod disposed substantially centrally of the casing, said hollow rod having a pipe connection at one end exterior to the casing, a pair of circular bracket members mounted centrally on said hollow rod adjacent the ends thereof, said bracket members having radially extending fingers, a sheet of filter cloth mounted on said fingers and held thereby in the form of a fluted cylinder, the ends of the flutes being folded over the end faces of the brackets to close the said ends of the flutes, and head members having peripheral portions extending longitudinally of the fluted cylinder to embrace the periphery of the bracket members to hold the filter cloth against longitudinal movement, said head members being secured to the hollow rod and holding in place the folded ends of the flutes, said hollow rod having an opening intermediate said brackets to provide communication with the interior of the fluted cylinder.

3. In a filter, a casing, a central rod having a portion thereof disposed within the casing, a generally cylindrical filter member formed of fabric, and means for supporting said filter member on and substantially co-axially with the rod, said means comprising a bracket secured on the rod near one end thereof, the said bracket having radially extending fingers over which the adjacent end of the filter member is folded, a head member having a flange telescoping with the bracket, said flange embracing the ends of the fingers and gripping the filter member between the ends of the fingers and the flange, and a head for closing the other end of the filter member.

4. An oil filter unit comprising a pipe, a plurality of slotted sheet metal spiders pressed on the pipe and evenly spaced thereon, means for preventing displacement of the end ones of said spiders on the pipe, a fluted filter member disposed over said spiders and in said slots, the ends of said member extending beyond the end ones of said spiders, dished discs pressed on said pipe to wad the ends of said member against the end ones of said spiders, flanges on said discs rolled over the edges of end spiders to bind them together, a baffle in said pipe adjacent one of said spiders, ports in said pipe outside of said baffle and the adjacent disc, outlet ports in said pipe within the cylinder formed by said fluted member, and a casing concentrically disposed around said fluted cylinder with said pipe projecting through its end walls.

5. A filter unit comprising a cylindrical pipe, a plurality of slotted metallic fins evenly spaced along and attached to said pipe, means for locking the end ones of said fins on said pipe, a filter unit surrounding said pipe and having pleats disposed in the slot of said fins, metallic cup-like discs pressed on to the ends of said pipe, flanges on said disc rolled over said end fins to lock said filter unit in place thereon, a casing surrounding said filter unit, through which casing said pipe extends and to which it is attached, said casing having inlet and outlet ports the former to admit liquid into contact with one of said discs and the latter to remove liquid from the inside of said filter unit.

6. A filter unit comprising a plurality of slotted sheet metal fins, a pipe on which said fins are evenly spaced, means for preventing dislodgment of the end ones of said fins longitudinally of said pipe, a fabric filter unit placed over said fins and pleated into the slots therein, dished metallic discs pressed over the ends of said pipe and against the ends of said fabric which project beyond said end fins, flanges on said dished discs rolled over the end ones of said fins to lock said filter unit thereon, said pipe extending beyond said disc and having a group of openings outside of one of said discs, a plug in said pipe obstructing it inwardly of said holes, said pipe also having another group of holes disposed interiorly of the cylinder formed by said filter member, a casing surrounding said filter member through which said pipe extends and to which it is attached, one end of said pipe forming an inlet through which oil is admitted to pass through the first of said openings into contact with said disc and through said filter unit and said second openings out of said casing.

7. An oil filter comprising the combination of a sealed casing, a central pipe disposed in the casing with its ends projecting from the ends thereof, a spider carried by the pipe, said spider having a slotted periphery, a fabric filter member fluted into the peripheral slots of said spider, means for clamping the ends of said member to the ends of the spider, and means for spreading the oil admitted to the filter over said clamping means to cool it before it comes into contact with said fabric member.

In witness whereof, I hereunto subscribe my name this 29th day of April, 1930.

DELMAR D. DOOLEY.